Patented Jan. 2, 1951

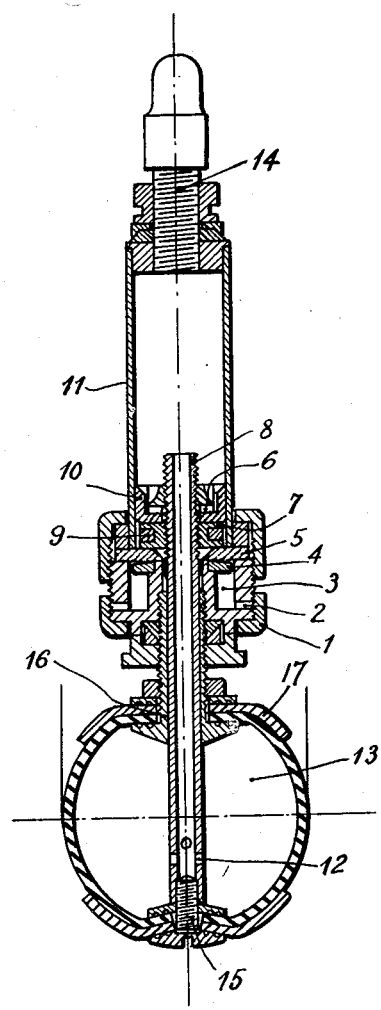

2,536,817

UNITED STATES PATENT OFFICE 2,536,817

AUTOMATIC PNEUMATIC TIRE INFLATER

Henri Lacroix and Charles Belli,
Geneva, Switzerland

Application December 11, 1946, Serial No. 715,400
In Switzerland November 23, 1945

Section 1, Public Law 690, August 8, 1946
Patent expires November 23, 1965

5 Claims. (Cl. 152—425)

It is annoying, when setting off on a run, to find that one of the tires on one's vehicle is partly deflated.

This annoyance is aggravated if one has to stop repeatedly for the purpose of replacing by means of a hand-pump the air that may have escaped from one tire or another.

The present invention enables such drawbacks to be eliminated.

It relates to an appliance for the automatic inflation of a pneumatic rim-tire, comprising a wheel with a pneumatic rim-tire and a piston pump disposed radially in the wheel against the rim of the latter, this pump is connected, on the rim side of the wheel, with the inner tube of the tire, with which it it communicates by a small hole through the medium of a cylindrical bearing in which the piston rod of the pump slides, this rod being tubular to allow the air under pressure coming from the pump to enter the inner tube of the tire, the end of the piston rod being fixed, at the extreme perimeter side of the wheel, to the wall of the inner tube for the purpose of utilising, for working the pump, the reciprocal motion which is produced, with each revolution of the wheel, by the flattening of the tire at every point on the perimeter of the wheel when one of these points is bearing on the surface of the road on which the vehicle is running.

The more the tire is inflated the shorter will be the stroke of the reciprocal motion corresponding to a constant load, borne by the wheel, and the pump will deliver less and less air into the inner tube of the tire.

Owing to a dead space which can be suitably regulated between the piston of the pump and a non-return valve of the air under pressure, the pump ceases to function when a certain pressure is reached.

It follows from what precedes that, while the vehicle is running, the inflation of the pneumatic tire is being automatically effected.

The appended drawing shows in section and as an example one embodiment of the appliance according to the invention.

In this example, the air-pump is provided with an intermediate chamber 3 between the entry 2 of the air from outside and the entry 4 of the air under the piston 6 of the pump, the object of this chamber being to enable the suction of the air from outside to be governed by a suitable adjustment of the partial closing of the holes through which the air enters.

1 represents the obturator in its "closed" position; the adjustment mentioned in the preceding paragraph is easily effected by screwing the obturator.

The "open" position is obtained by unscrewing the obturator.

The air sucked in by the pump passes through the holes 2 into the intermediate chamber 3.

In this chamber, the air passes through the circular slit 4 and arrives under the clack-valve 5, which rises slightly when the piston 6 of the pump tends to create a vacuum above the clack-valve.

The baffle 7 which forms part of the attachment of the piston 6 to the tubular rod 8 of the piston 6 bears a groove 9 packed with thread, wax, paraffin wax or any other packing substance the volume of which can easily be reduced so as to increase the dead space between the clack-valve 5 and the piston 6, this space existing there at the moment when the pump is just going to suck air in and it will cause, by reason of its enlargement, a lowering of the maximum pressure that the pump is able to produce.

When subsequently the piston 6 moves in the opposite direction, it compresses the air which has penetrated into the space enclosed between it and the clack-valve 5.

This compressed air then forces a passage between the dished leather 10 of the piston 6 and the cylinder 11 of the pump body by slightly thrusting aside the leather 10 from the wall of the cylinder 11 and penetrates by way of the tubular rod 8 of the piston 6 and through the holes 12 into the inner tube of the pneumatic tire 13.

At 14 is shown fitted to the end of the pump opposed to that on the rim 17 of the wheel an ordinary tire-inflation valve enabling inflation by any usual means.

At 15 is shown the attachment of the rod 8 of the air-pump piston.

At 16 is shown the attachment of the pump to the pneumatic tire.

In the operation of the inflator according to the present invention, the piston stroke is reduced as the pressure increases in the tire and in order that the pump can assure a sufficient air pressure in the tire, it is indispensable that the space inside of which the air is compressed be on the rim side of the piston, as on this side, the reducing of the stroke does not cause an increase of the waste space which remains constant. It is to be observed that, in the apparatus described, the plunger is subjected to a force which pushes it towards the rim and reduces the effort put upon the tire by the plunger rod. This force results from the fact that the piston is submitted, on the side of the cylinder opposite the rim, to the air pressure which is in the tire, owing to the presence of the inner conduit in the inside of rod 8. In this way the periphery of the tire does not exert on the plunger rod the necessary effort to displace said plunger by its moving towards the rim when it compresses the air, since if it were the periphery of the tire which gave this force, there would be a rapid wear of the tire.

What we claim is:

1. A tire inflator for pneumatic rim-tires comprising in combination a wheel having a tire mounting rim, a pneumatic tire mounted on said rim; a piston-pump disposed radially of said wheel and mounted thereon, a pump plunger in said pump attached at one end to a point on the periphery of said tire and adapted to be reciprocated for operating said piston by the flattening of said tire at each revolution of the said wheel when in motion, an air receiving and compressing space within said pump, said space being located on the side of the pump cylinder adjacent said rim, and means providing communication between said space and the interior of said tire, said plunger being permanently subjected on its side opposite said rim to the normal air under pressure within said tire.

2. A tire inflator for pneumatic rim-tires comprising in combination a wheel having a tire mounting rim; a pneumatic tire mounted on said rim, a piston-pump disposed radially of said wheel and mounted thereon, a pump plunger in said pump, , a tubular rod carrying said plunger secured at one end thereof to a point on the periphery of said tire and adapted to be reciprocated for operating said piston by the flattening of said tire at each revolution of the said wheel when in motion, an air receiving and compressing space within said pump disposed substantially adjacent said rim, an air passage connecting said space with the interior of the tire, said space being located on the side of the pump cylinder adjacent said rim, and said plunger being permanently subjected on its side opposite said rim through said tubular rod to the normal air under pressure within said tire.

3. A tire inflator for pneumatic rim-tires comprising in combination a wheel having a tire mounting rim, a pneumatic tire mounted on said rim; a piston-pump disposed radially of said wheel and mounted thereon, a pump plunger in said pump attached at one end to a point on the periphery of said tire and adapted to be reciprocated for operating said piston by the flattening of said tire at each revolution of the said wheel when in motion; an air receiving and compressing space within said pump, an auxiliary chamber within the pump between an air intake communicating with the outside of the pump and an inlet valve communicating with said space; means within said chamber for controlling the air input from said air intake to said space, said space being located on the side of the pump cylinder adjacent said rim, and means providing communication between said space and the interior of said tire, said plunger being permanently subjected on its side opposite said rim to the normal air under pressure within said tire.

4. A tire inflator for pneumatic rim-tires comprising in combination a wheel having a tire mounting rim, a pneumatic tire mounted on said rim, a piston-pump disposed radially of said wheel and mounted thereon, a pump plunger in said pump attached at one end to a point on the periphery of said tire and adapted to be reciprocated for operating said piston by the flattening of said tire at each revolution of the said wheel when in motion, said plunger constituting the outlet valve of the pump, an air receiving and compressing space within said pump, said space being located on the side of the pump cylinder adjacent said rim and means providing communication between said space and the interior of said tire, said plunger being permanently subjected on its side opposite said rim to the normal air under pressure within said tire.

5. A tire inflator according to claim 4, wherein said communication means comprises an air passage within said plunger.

HENRI LACROIX.
CHARLES BELLI.

REFERENCES CITED

The following references are of record in the file of this patent:

UNITED STATES PATENTS

| Number | Name | Date |
| --- | --- | --- |
| 1,125,678 | Fernandez | Jan. 19, 1915 |
| 2,030,592 | Hosking | Feb. 11, 1936 |